H. A. KLEMM.
KNITTING MACHINE.
APPLICATION FILED MAY 15, 1914.
1,257,491.
Patented Feb. 26, 1918.
10 SHEETS—SHEET 7.
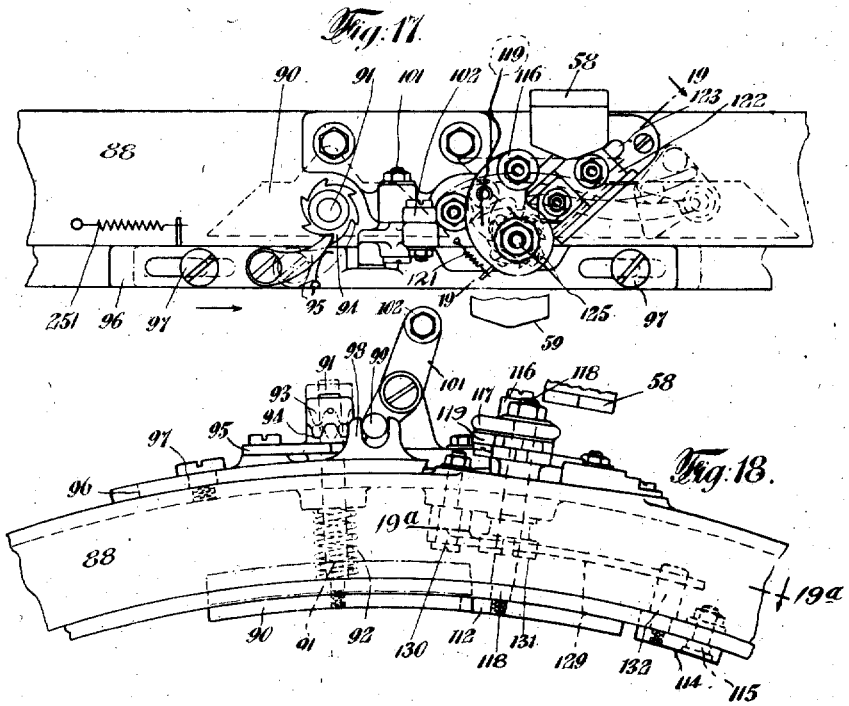
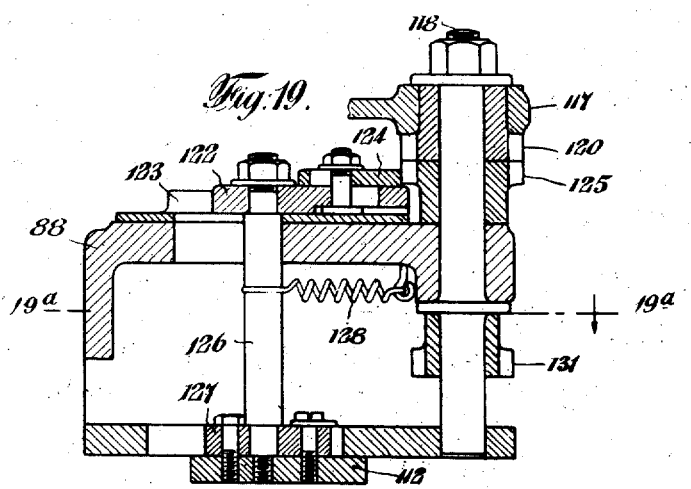
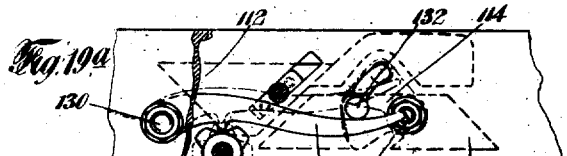

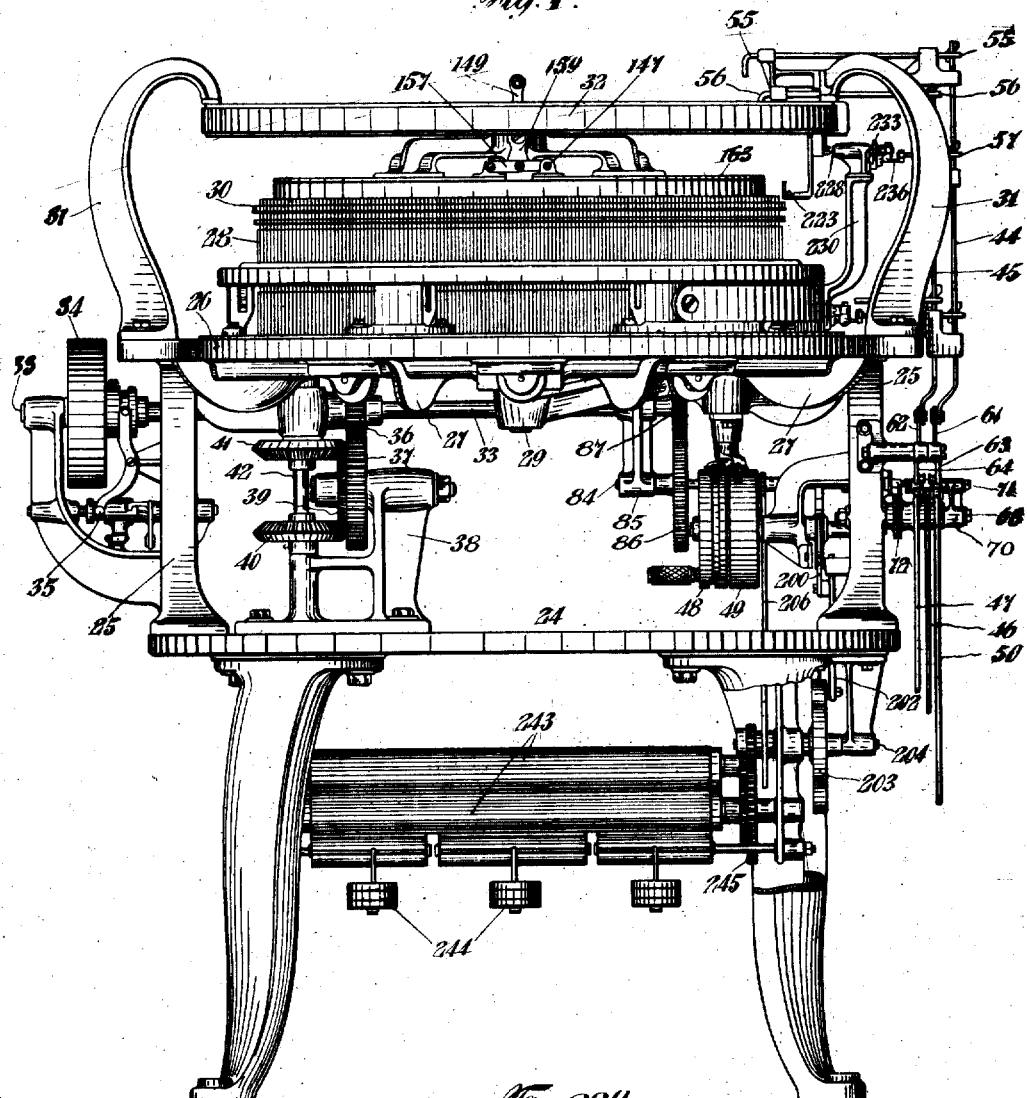

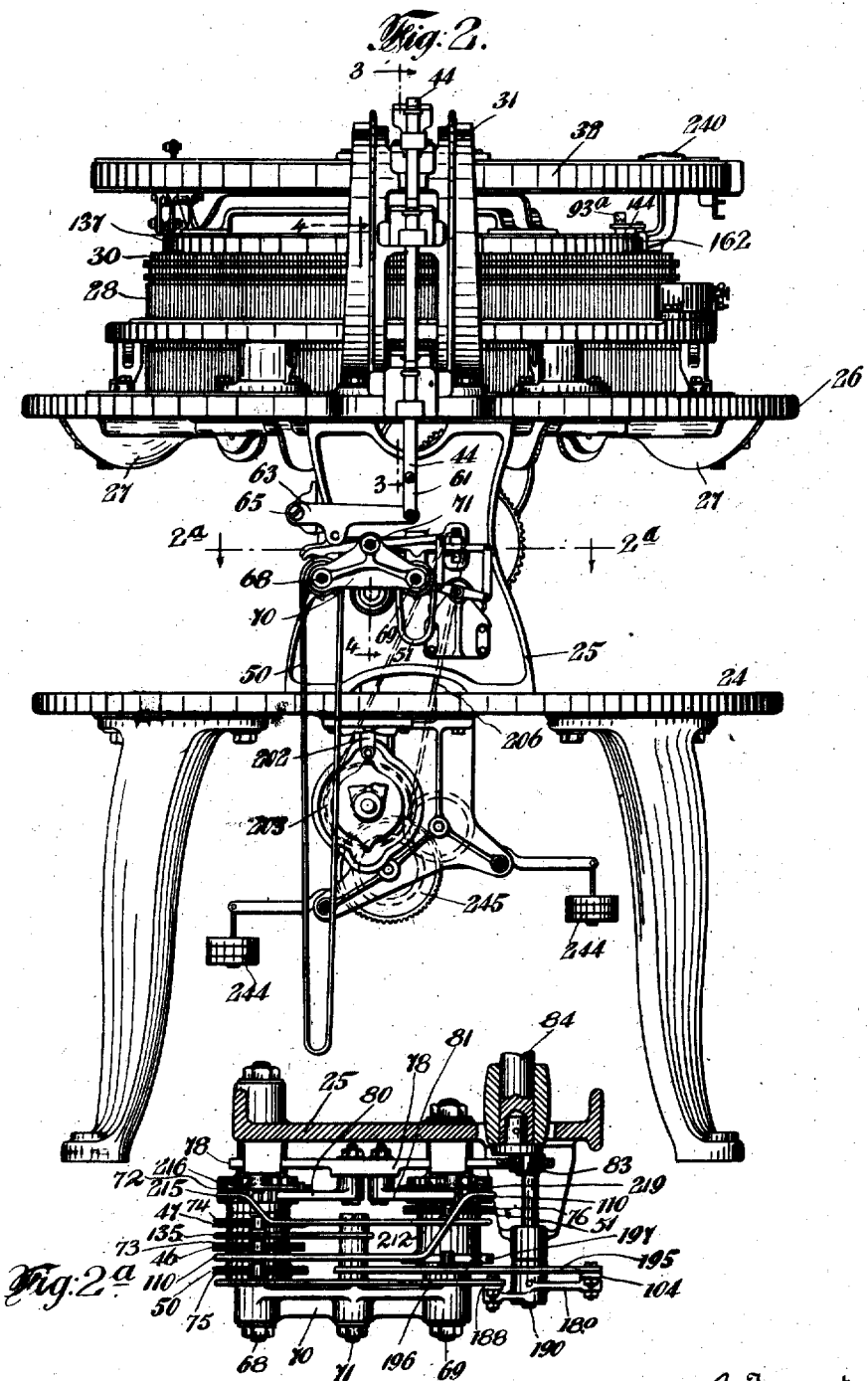

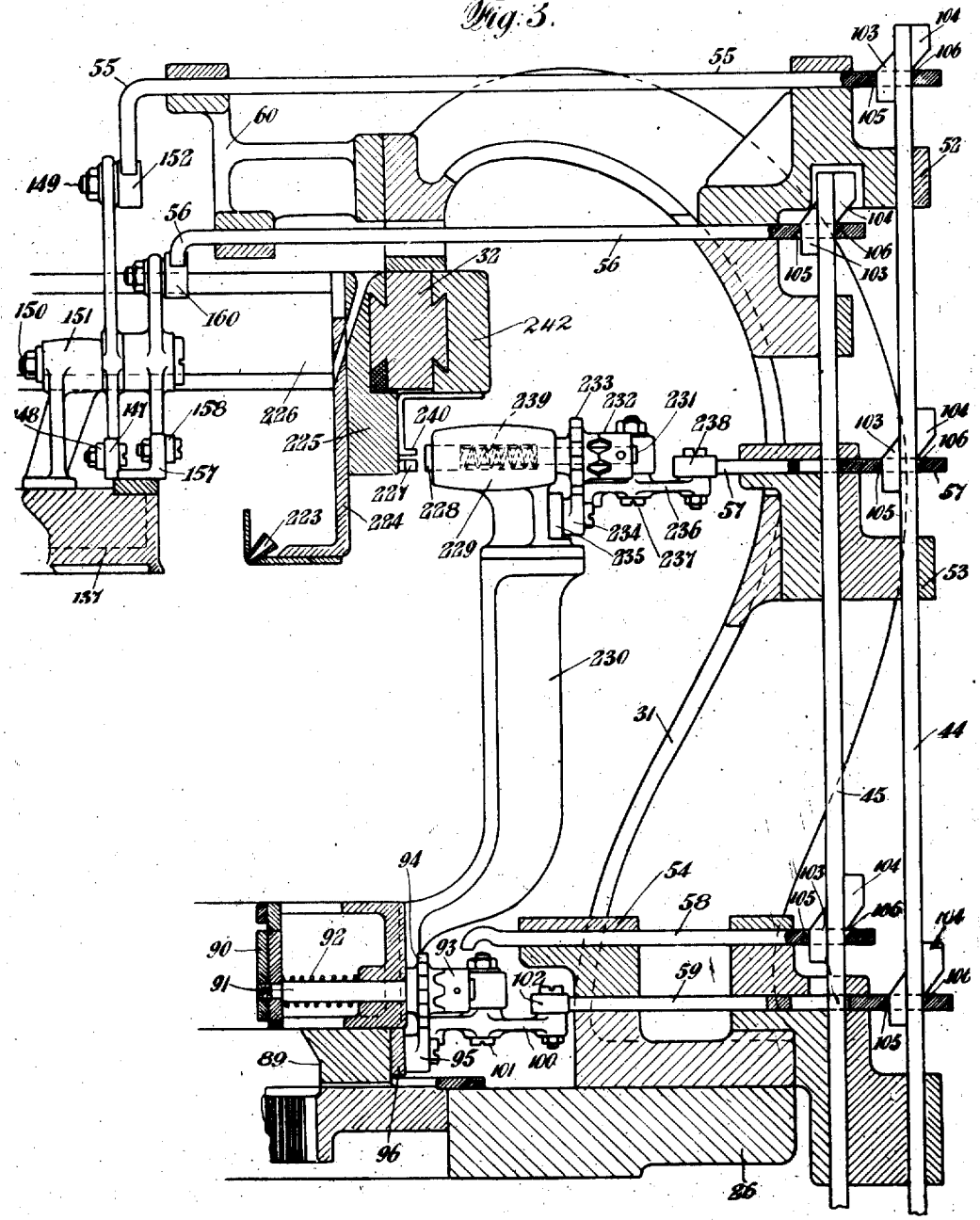

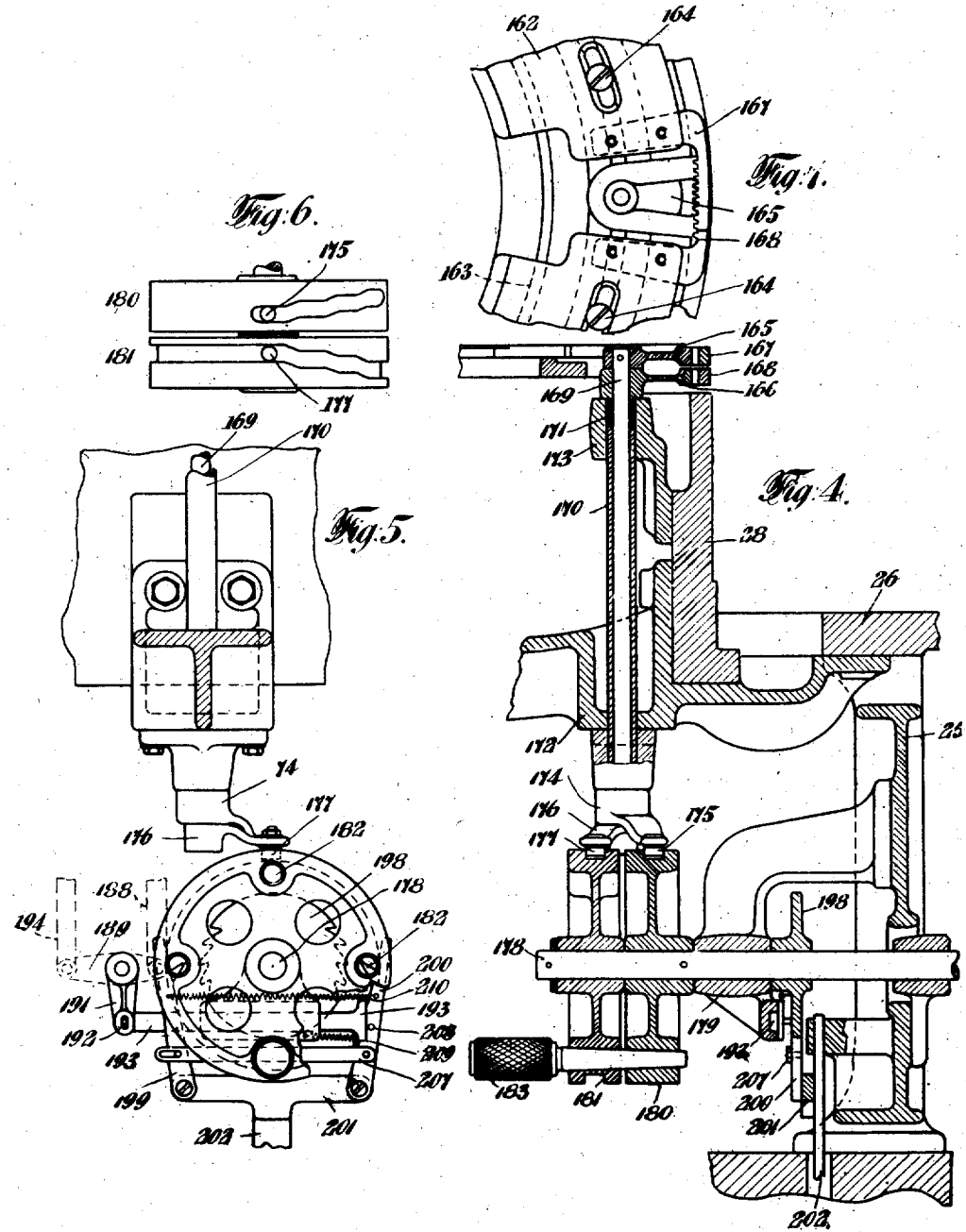

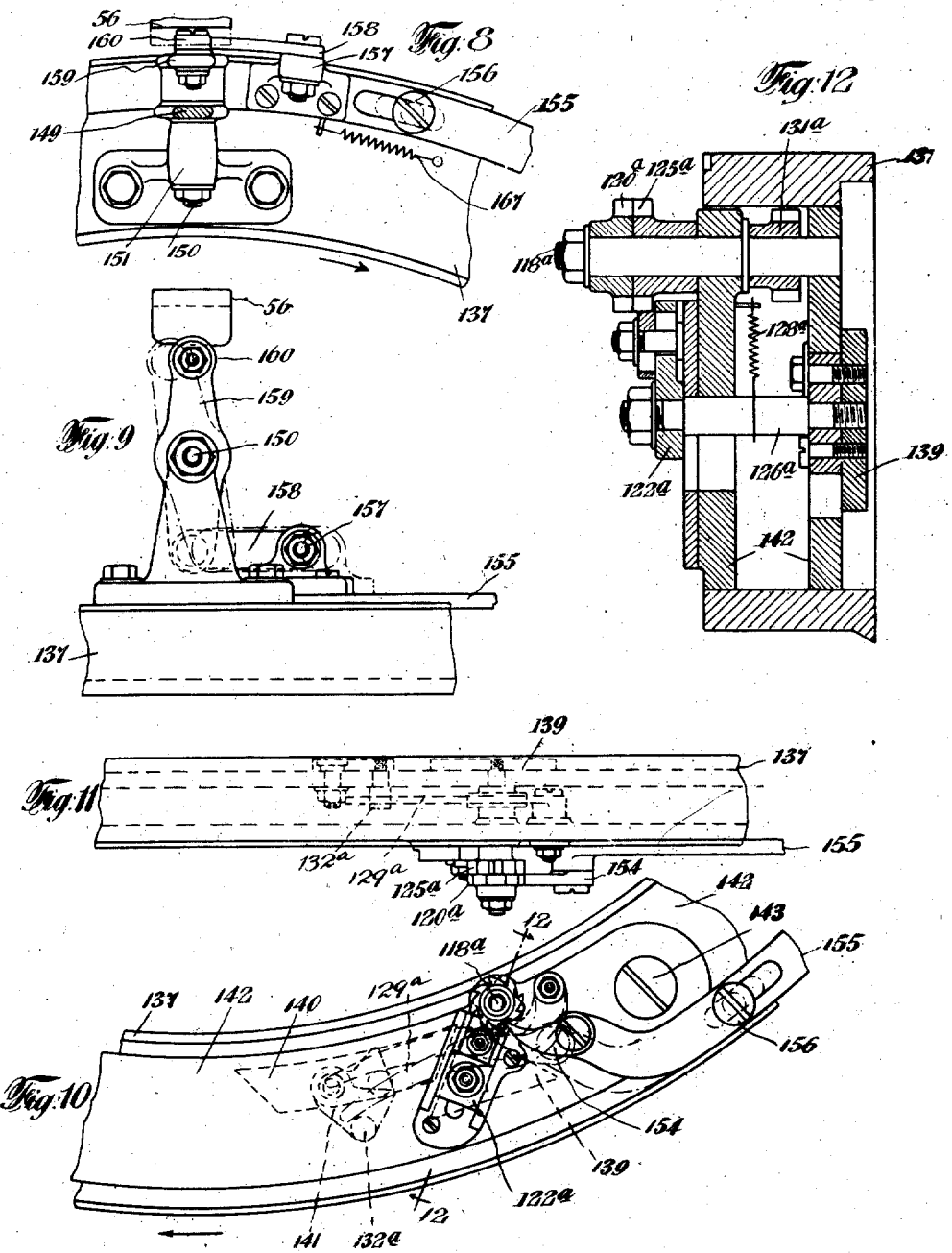

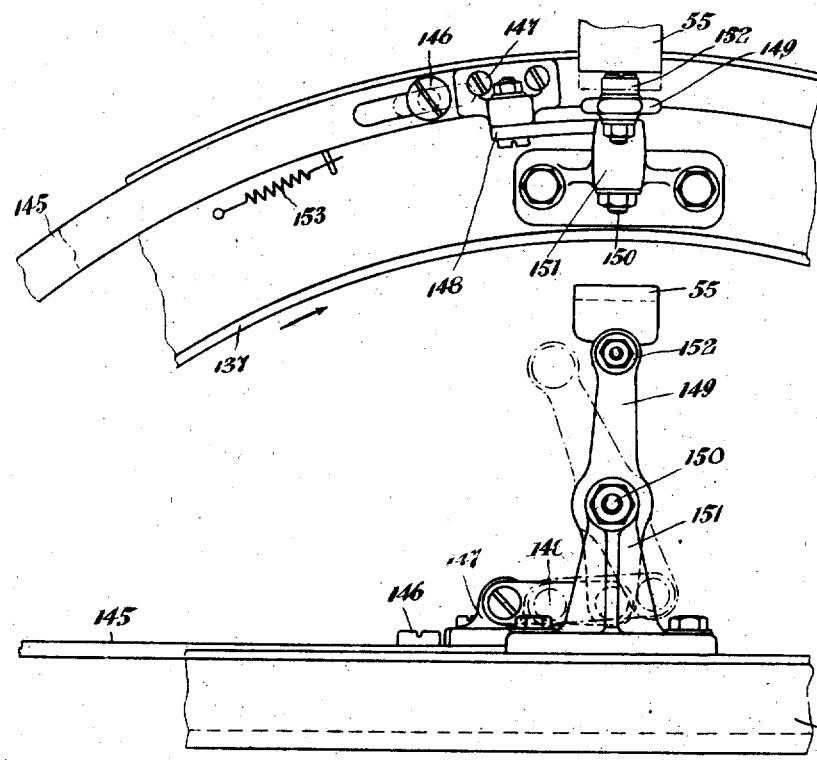
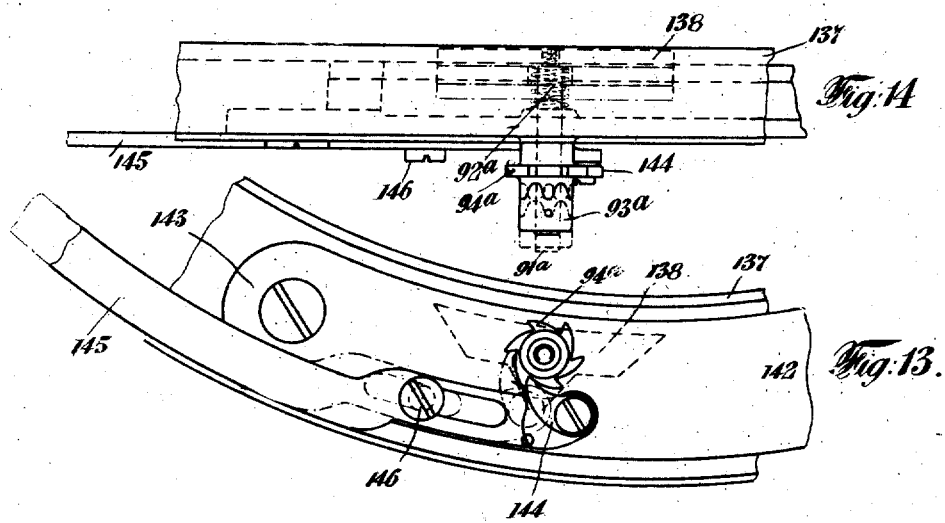

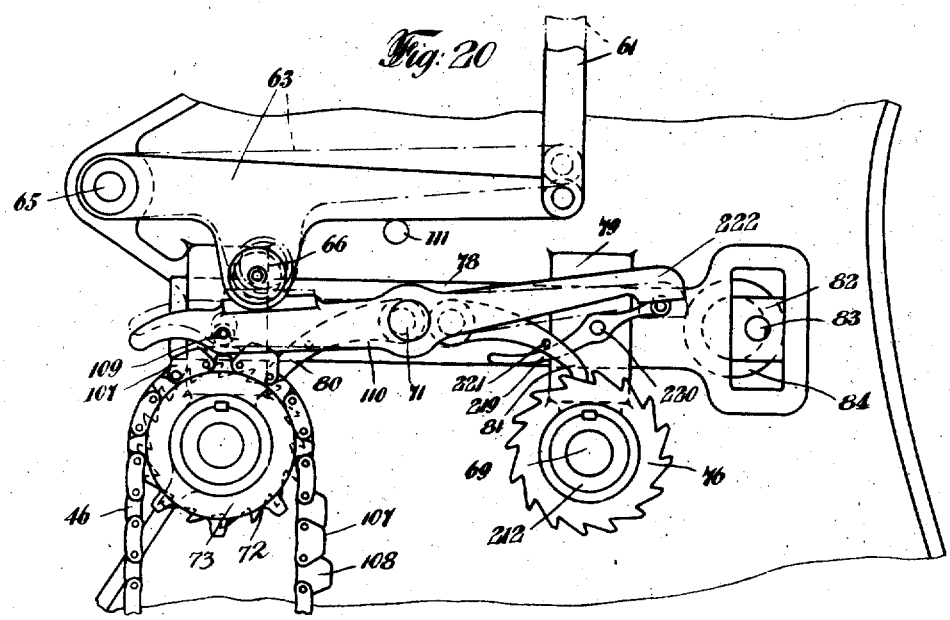

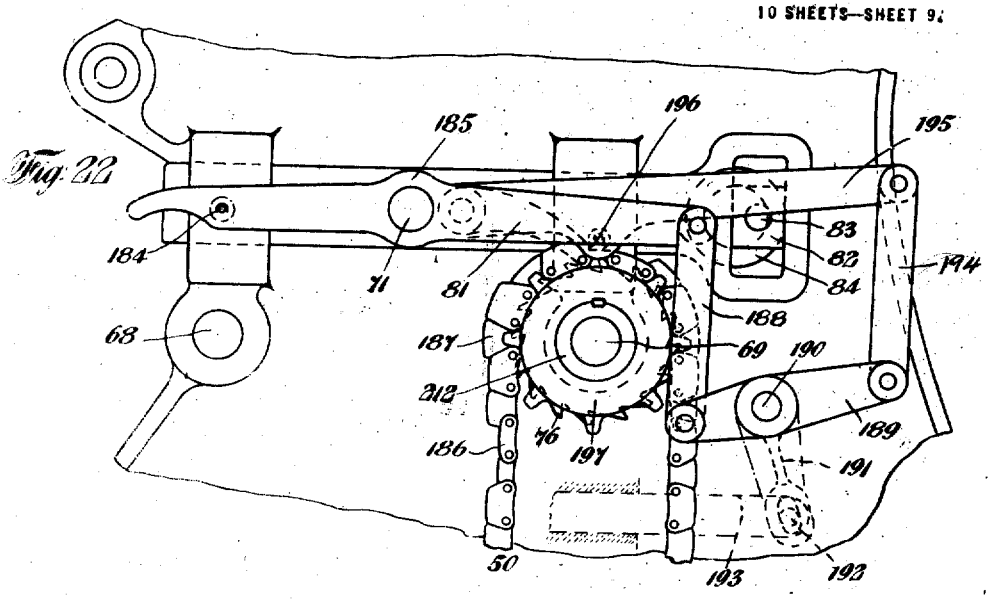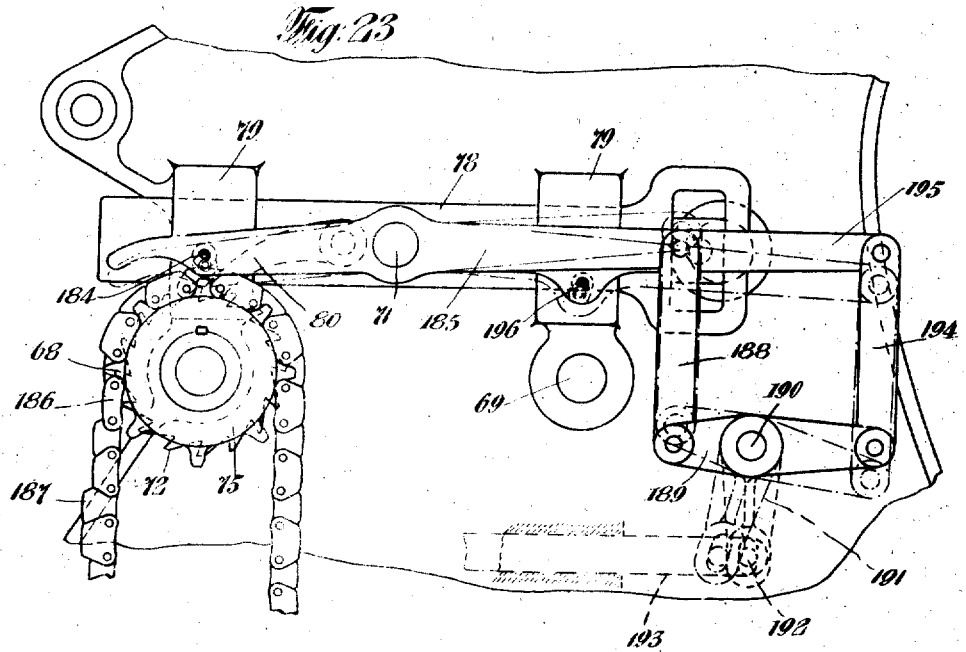

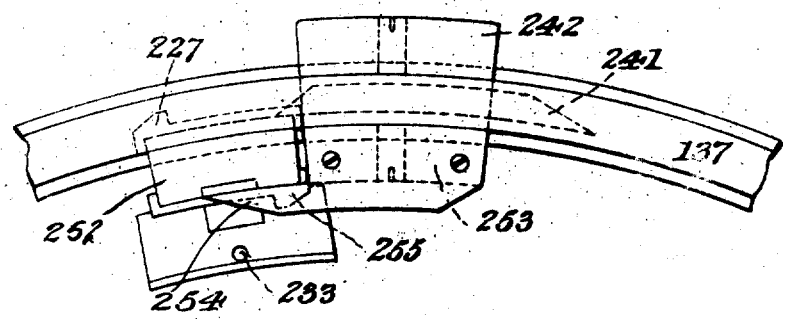
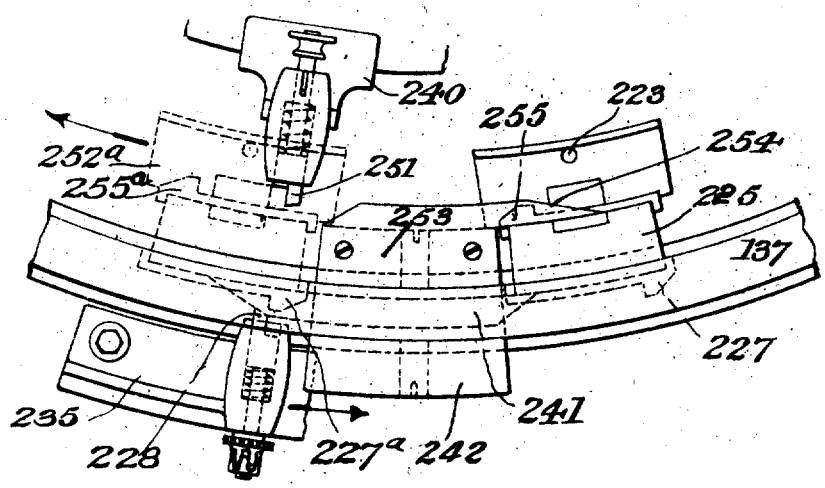

UNITED STATES PATENT OFFICE.

HERMANN A. KLEMM, OF HARRISON, NEW YORK, ASSIGNOR OF ONE-HALF TO JAMES D. LEYS, OF NEW YORK, N. Y.

KNITTING-MACHINE.

1,257,491.   Specification of Letters Patent.   Patented Feb. 26, 1918.

Application filed May 15, 1914. Serial No. 838,844.

*To all whom it may concern:*

Be it known that I, HERMANN A. KLEMM, a citizen of the United States, residing in Harrison, county of Westchester, State of New York, have invented certain new and useful Improvements in Knitting-Machines, of which the following is a specification.

The improvements in knitting machines forming the subject of this invention relates to the automatic control of the needle cams, the racking device and means for laying separating thread whereby articles having various kinds of knitting throughout their lengths may be continuously connectedly made. The devices of this invention are particularly designed to be applied to machines embodying the features of the circular knitting machine of the patent issued to me October 15, 1907, No. 868,276. This patented machine is adapted to produce flat knitted goods, ribbed goods, tubular fabrics, welts and pattern goods, and comprises a cylindrical needle bed and a horizontal or disk needle bed each having two groups of needles arranged with narrow spaces between them, two sets of cams and two cam carriers for the cylinder needle bed and for the disk's needle bed; means for rotating the cam carriers of each of the needle beds in opposite directions, the cams being caused to act alternately on the two groups of needles of each of the sets of needles and the needles being provided with two butts, a yarn carrier for each group of needles alternately moved by the cam carriers to act in presenting the yarn to the needles in unison with the cams. It also includes means for racking the needles to produce pattern fabrics, &c. This machine is thus adapted to simultaneously produce two articles or pieces of knitted fabric with the least possible loss of time due to intervals when the cams are necessarily inactive, that is at the time they are passing by the narrow spaces between the two groups of needles of each set to act alternately on the needles of each group.

In the accompanying drawings:—

Figure 1 is a front elevation of the machine with a part of the frame broken away.

Fig. 2 is a side elevation, looking toward the left of Fig. 1.

Fig. 2ª is a detail of the pattern control devices in plan on line 2ª, 2ª Fig. 2.

Fig. 3 is a section on line 3, 3 Fig. 2, showing parts of the cam controlling devices, also the separating thread controller.

Fig. 4 illustrates a part of the needle racking means, in vertical section on line 4, 4, Fig. 2.

Fig. 5 is a side view of the lower part of Fig. 4.

Fig. 6 is a plan view of the racking cams.

Fig. 7, a plan of the upper part of Fig. 4, showing the upper or disk needle bed shifting device.

Fig. 8 is a detail in plan of a part of the controlling device of a cam for actuating the needles of the disk bed.

Fig. 9, an elevation of Fig. 8.

Fig. 10 is a plan of the cam and its carrying ring at the opposite side to that shown in Fig. 8.

Fig. 11 is an elevation of Fig. 10.

Fig. 12 is a sectional view on an enlarged scale taken on line 12, 12, Fig. 10.

Figs. 13 and 14 illustrate a plan and elevation respectively of a cam for the disk needles and means for throwing it out of action.

Figs. 15 and 16 show in plan and elevation another part of this cam actuating means at the opposite side of the cam ring.

Fig. 17 shows in elevation cam actuating devices for the needles of the cylinder bed of the machine.

Fig. 18 is a plan view of the same.

Fig. 19, a sectional view on an enlarged scale on line 19, 19, Fig. 17.

Fig. 19ª is a detail plan of the cam shown in Figs. 17 and 18, on line 19ª.

Fig. 20 shows the pattern chain and coacting devices for operating the throw-out devices of the disk and cylinder cams and also for actuating the separating thread control.

Fig. 21 shows the pattern chain and coacting devices for operating the other cams of both the disk bed and cylinder bed needles.

Figs. 22 and 23 show the pattern chains and coacting devices for operating the racking means.

Fig. 23ª illustrates articles as made by the machine, conventionally showing a sleeve of a sweater.

Fig. 24 is a plan view of the separating thread carriers and their actuating latches.

The frame comprises a bed plate 24 supported on suitable legs and on which are mounted standards 25, 25 which carry a flat ring 26. This ring by under brackets 27 supports the cylinder needle bed 28, and also by a bracket and central stem 29 it supports the upper or disk needle bed 30. Extending from the ring 26 are standards 31, curved inwardly at their upper ends and to which is secured a ring 32 having guide-ways on its inner and outer sides upon which travel the thread carriers and also cam ledges for controlling certain parts of the machine.

The cam carriers for both the cylinder needle bed and the disk needle bed are rotated in opposite directions by suitable gearing—here shown as a drive shaft 33, with pulley 34 and stop drive 35, a pinion 36 on shaft 33 meshing into a gear 37, carried on a shaft having its bearing in the standard 38. On gear 37 is a bevel wheel 39 which meshes into counter bevel wheels 40 and 41, the wheel 40 being secured to a vertical shaft 42 and the wheel 41 to a sleeve on this shaft. This vertical shaft and sleeve actuate the cam carriers of both of the needle beds in manner similar to the corresponding or similar devices of my before-mentioned patent. In general the construction and mode of operation of the machine is as follows. The needles of the cylinder bed and horizontal bed are divided into two groups with blank spaces or gaps between the groups of needles. All of the needles have two butts, and cam carriers with suitable cams are provided to act on the butts,—that is, there are two cam carriers for each of the needle beds operated to actuate successively the needles of the two groups of each bed. The cam carriers which act on the lower butts of the cylindrical bed needles and the inner butts of the horizontal bed needles rotate in one direction; and the other two carriers, acting on the upper butts of the cylinder bed needles and the outer butts of the horizontal bed needles respectively, rotate in the opposite direction. Suitable thread layers are provided adapted to reciprocate over each pair of groups of needles, and cam carriers rotating in opposite directions control means for alternately reciprocating the thread layers. Thus the machine produces two articles simultaneously and lays two courses of stitches in each article for every complete revolution of the machine. As this invention relates solely to means for automatically controlling the needle cams, whereby completed articles may be made with various kinds of knitting stitches in different parts of them, means for automatically racking the needles and means for laying a separating thread between the articles as they are connectedly continuously formed, it is thought unnecessary to cumber up this case with more drawings and description of the main parts of the machine, as these special devices of this invention may be used in other machines than the one described in said patent, as will all be understood by those skilled in the knitting art.

The essential features of this invention will be fully described by reference had to the accompanying detail drawings.

The direct means for setting the needle cams are actuated through the medium of vertically sliding bars 44 and 45, and the primary means are pattern chains 46 and 47 acting through mechanism hereafter described to reciprocate respectively the bars 44 and 45.

The needle racking is accomplished by means of cams 48 and 49 oscillated by suitable mechanism hereafter described controlled by pattern chain 50.

To avoid the necessity of making the chains 46, 47 and 50 inconveniently long, as they control the formation of the articles throughout the length of a garment being made, they are intermittently actuated by a chain 51, Fig. 21.

The separating thread controlling mechanism is also controlled by the vertical bar 44.

Bars 44, 45 are fitted to slide in bearing blocks 52, 53 and 54, carried by one of the curved standards 31 of the frame, said blocks being also provided with guide bearings in which slide horizontal bars 55, 56, 57, 58, and 59. The inner ends of the bars 55, 56 are guided in block 60 extending from the inner upper end of said standard 31. The lower ends of the bars 44, 45 are by links 61, 62 connected to the ends of levers 63 and 64 respectively. These levers rock on a stud 65 projecting from the standard 25 of the frame, and are provided mediate their ends with operating rollers 66 and 67. Extending from the standard 25 are two studs 68, and 69 carrying at their outer ends a triangular plate 70, which has at its upper angle an inwardly extending stud 71. On the stud 68 is a sleeve carrying a ratchet wheel 72 and also the sprocket wheels 73, 74 and 75 on which hang the pattern chains 46, 47 and 50 respectively, and on the stud 69 is a sleeve carrying a ratchet 76 and the sprocket wheel 211 on which hangs the chain 51, and also another sprocket wheel on which chain 50 may be placed, as hereafter described. On a slide 78 seated in suitable bearings 79 on the face of the standard 25 is a pawl 80 arranged to act on the ratchet wheel 72 and a pawl 81 arranged to act on the ratchet wheel 76. This slide has a vertical slot bearing on its end in which is a block 82 controlled by a crank pin 83 on the end of a shaft 84, having a bearing in the standard 25 and also in a bracket 85 depending from the bed 26. A gear wheel 86 on the shaft 84 is driven by a pinion 87 on the end of the main shaft 33.

Referring to Figs. 17, 18, 19 and 19ª, 88 indicates a rotating cam carrier for the cylinder needle bed of the machine; it is attached to and caused to travel with a ring 89 (see Fig. 3) which is continuously rotated. I would here mention that there are two sets of cams for each of the two sets of needles, the needles of each set being divided into two groups, to provide for making simultaneously two articles on the machine; and that the needles are provided with two butts. The cam carrier with the cams for operating on the outer butts of the horizontal needles, and the upper butts of the vertical needles, that is the butts nearest the hook ends of the needles, not shown in the drawings, are similar in all respects to the corresponding devices of my beforementioned patent, and I would here call attention to the fact that this statement applies to the cams, &c., for operating inner butts of the horizontal needles. In this case, however, referring to the horizontal needles, the cams and their actuating devices as illustrated in the drawings are adapted to control the needles by their outer butts. The cam 90 is set out in active position when the separating thread is laid, as shown in Fig. 18. At other times it is moved into inactive position within the face of the carrier 88. When the cam is in active position it engages the lower butts of the needles and operates the needles to lay a course of the separating thread between two courses of the regular knitting. A stem 91 extends from the cam 90 through the outer wall of the carrier. On it within the carrier is a spring 92 which forces the cam outwardly, and on its outer end is secured a clutch shaped device 93 with cam shaped teeth which co-act with corresponding shaped teeth extending from the face of a ratchet wheel 94, fitted to rotate on the stem 91. This ratchet is actuated by a pawl 95 carried on bar 96 slidably held on the cam carrier by screws 97, in slots in the bar. Projecting from this bar is a forked extension 98 in which works a roller or stud 99 carried by a lever 100, and this lever is pivoted at 101 to a bracket on the cam carrier. The other end of this lever is provided with a roller 102, which, as the carrier rotates, in direction indicated by the arrow, comes in contact with the end of the horizontal bar 59 and so causes the ratchet wheel 94 to move one tooth as the roller passes over the end of the bar; this movement of the ratchet lifts the cam 93 with its high parts resting on the high parts of the cam teeth of the ratchet and so withdraws the needle cam 90 and holds it out of action until the bar 59 is again projected into the path of travel of the roller 102; then the ratchet 94 is again moved one tooth and the cam 93 closes into the cam teeth of the ratchet and the cam 90 is moved out by the spring 92, as shown in full lines in Fig. 18. The parts of this device are set in operative position by the spring 251 which acts on bar 96. The horizontal bar 59 is moved back and forth as the bar 44 is moved vertically through the medium of wedge blocks 103 and 104 attached to the bar 44 and working in a slot in the bar 59 having counteracting inclined edges 105 and 106 respectively; the arrangement being such that as the bar 44 is moved upwardly the bar 59 is set with its end in the path of travel of the roller 102, and when it moves downwardly the bar 59 is withdrawn and held away from the roller, as said roller passes by it. Similar wedge acting devices operate all of the other horizontal bars 55, 56, 57 and 58 and are similarly marked.

The vertical bar 44 is actuated, as before described, by the pattern chain 46 which has some of the links formed with cam surfaces 107 and 108 of different heights, see Fig. 20; these act on a roller 109 carried by a lever 110 which rocks on the stud 71, and this lever by its upper face acts on the roller 66 of the lever 63, which is connected to the vertical bar 44 by the link 61. The downward position of the bar 44 is determined by a pin 111 projecting from the frame of the machine under the lever 63. The lever 63 is raised when the roller 109 of the lever 110 is acted upon by the cam links 108. The effect of the rocking of the lever 110 as its roller is acted upon by the cam links 107 and as it falls into lowermost position will be hereafter described, and during such movements of the lever 110 the lever 63 is not affected as it rests on the pin 111. The cam 90 is out in operative position when the separating thread is being laid in one course of stitches made by cylinder bed needles and one course made by the horizontal or dial bed needles.

The other needle cams carried by the cylinder cam carrier 88, shown in Figs. 17 and 18 but more clearly in plan view in Fig. 19ª, comprise a triangular cam 112 and an elongated cam 113, said elongated cam being provided with a latch piece 114 pivoted at 115, adapted when depressed to lie within and form a continuation of the upper straight edge of the cam and when raised to act as a riser for the needles. The triangular cam 112 is also fitted to slide in an angular up and down direction. When it is in downward position the latch 114 is also down and then the needles retain the loops to form such stitches when the next succeeding row of stitches are being formed. The cam 112 and latch 114 are set in upper position together and then the needles are held up sufficiently high to cast off when the said next succeeding course is being laid. They may be cast when the second following row of stitches are being laid, thus causing two adjoining stitches to be elongated each to extend over two courses of stitches. The effect on the yarn when the cam 112 is in upper position is to reduce the amount of yarn by forming less slack in the loops when regular stitches are being made.

The cam 112 and latch 114 are controlled by the horizontally sliding bar 58, whose inner end is bent downwardly so as to act on a roller 116 when said bar is moved into position, shown at Fig. 3. This roller 116 is on an arm 117 rocking on the upper end of a shaft 118 having bearings in the cam carrier 88. On the arm 117 is a pawl 119 arranged to act on a ratchet wheel 120 secured to the shaft 118. A spring 121 sets the arm 117 back in position to be acted upon by the bar 58 after it has been moved by the same. 122 designates an angularly arranged slide held in a bearing 123 secured to the cam carrier 88, and this slide carries an adjustable block 124, with a pointed end acted upon by a cam 125 secured to shaft 118 and having one-half as many risers as there are teeth in the ratchet 120. A stud 126 extends from the slide 122 through the carrier and has secured to its end a plate 127 fitted to slide in a slot in the carrier, arranged at the same angle as the bearing of slide 122. Cam 112 is secured to the plate 127, it thereby being moved in an angular direction and held up by the slide 122 when one of the high points of the cam 125 acts on the block 124 of the slide 122. A spring 128 attached to stud 126 and the cam carrier draws the cam 112 into its lower position when the cam 125 is moved to allow the point of the block 124 to enter one of its depressions. The latch 114 of cam 113 is moved simultaneously with the cam 112, that is the cam and latch are moved up and down at the same time. A lever 129 located inside of and pivoted at 130 to the cam carrier 88 is, by a projection on its side, actuated by a cam 131 secured to the shaft 118; said cam is similar to cam 125; the end of the lever acts on a pin 132 extending from the latch 114 through a circular slot in the inner wall of the carrier 88, in such manner that when the lever is resting on one of the risers of the cam 131 the latch is held in upper or outer position, and from this position it is depressed by the action of the needles thereon, so as to afford a straight path for the butts of the needles over the upper edge of cam 113, when the cams 125 and 131 are moved for their coacting parts to enter low parts or depressions of the cams.

The horizontal sliding bar 58, which actuates the devices just described is moved by the vertical bar 45, and this bar is raised by cam links 133 carried by the chain 47, see Fig. 21. The cam links act on roller 134 of a lever 135 rocking on the stud 71, and this lever has a bearing face 136 which acts on the roller 67 of the lever 64, whose end is by a link 62 connected to the lower end of the bar 45. Lever 64 rests on the pin 111 when the roller 134 falls off the cam link 133.

The needles of the upper or horizontal bed 30, as before stated, are automatically controlled by their outer butts by cams on the outer circular cam carrier 137, as shown in Figs. 8 to 15. The cams 138, 139 and 140 with its latch 141 are arranged and actuated similarly in all essential features to the cams 90, 112 and 113 with its latch 114 of the needles of the cylinder bed before described. These cams 138, 139 and 140 are for convenience of manufacture and adjustment carried by a frame 142 held by screws 143 in the cam carrier 137. The cams are shown in different views for convenience of illustration, for instance the cam 138 and its operating mechanism are illustrated in Figs. 13 to 15 and the cams 139, 140 are illustrated in Figs. 8 to 12. To simplify description and facilitate comparison with the devices shown in Figs. 17 to 19$^a$ similar indicating numbers will be used with an exponent "a"; cam 138 is pressed outwardly to act on the needles by a spring 92$^a$ surrounding a stud 91$^a$ extending from the cam through the circular carrier 137. A clutch shaped cam 93$^a$ is secured to upper end of the stud and its counterpart is attached to or forms part of a ratchet wheel 94$^a$. In this case the ratchet wheel 94$^a$ is acted upon by a pawl 144 carried on the end of a flat circular bar 145 located on and held in position by screws 146, in slots formed in the bar, on the circular cam carrier 137. This bar 145 extends about half way round the carrier and to its end diametrically opposite the pawl end is secured a short standard 147, to which is connected one end of a link 148, whose other end is pivoted to the lower end of a lever 149. This lever rocks on a stud 150 extending from a bracket standard 151 secured to and projecting upwardly from the cam carrier 137. The upper end of lever 149 is provided with a roller 152, which is in the path of and strikes against the end of the horizontal bar 55, when said bar is set in active position by the upward movement of the vertical bar 44 which is controlled by the pattern chain 46, as before described. The action of the bar 55 on the roller 152 is to move the lever as shown by dotted lines in Fig. 16 and cause the pawl to feed the ratchet wheel 94$^a$ one tooth. A spring 153 moves the bar back and sets the lever 149 into position shown by full lines in Figs. 13 to 16 when the roller 152 moves off the end of bar 55 as the cam carrier is rotated. The operation of these parts occurs when the separating thread is to be laid in a course of stitches formed by the horizontal set of needles. Referring to Figs. 10, 11 and 12 the sliding cam 139 is connected by stud 126ª to the slide 122ª, actuated by the cam 125ª, which is secured to the shaft 118ª. The operating ratchet wheel 120ª and another cam 131ª are also secured to shaft 118ª. The cam 131ª acts on the lever 129ª which raises the latch 141 of the cam 140 by acting on the pin 132ª. The functions and operation of these devices are similar to the corresponding devices carried by the cylinder cam carrier 88. A pawl 154 carried at one end of a flat circular bar 155 actuates the ratchet wheel 120ª. Said bar extends around the cam carrier opposite the circular bar 145, and is attached to the carrier 137 by sliding connections, consisting of screws 156 passing through slots in the bar. To the other end of the bar 155 is attached a short standard 157, which, by a link 158 is connected to the lower end of a lever 159, rocking on the stud 150 alongside the lever 149. At the upper end of the lever 159 is a roller 160, which by striking the end of the horizontal bar 56 causes the lever to move into position shown by dotted lines, Fig. 9, and the pawl 154 to partly rotate the ratchet wheel 120ª. A spring 161 acts on bar 155 to set the lever 159 back when the roller 160 leaves the bar 56. This bar 56 is moved into the path of travel of the roller 160 by the vertical bar 45 during its upward movement, effected by the pattern chain 47, see Fig. 21.

The means for racking the needles are shown in detail, Figs. 4 to 6, applied to the horizontal needle bed, which for this purpose is divided into two parts 162 and 163, supported and guided on the stationary bed 70 so as to be free to independently move about the vertical axis of the machine; they are held by screws 164 which rest in countersunk circular slots and are controlled by segmental gears 165 and 166 which mesh into the internal toothed sections 167 and 168 secured to the two parts of the needle bed 162 and 163 respectively. The segment gear 165 is secured to a vertical shaft 169, located in sleeve shaft 170, to the upper end of which the segmental gear 166 is secured; said sleeve being preferably made in two parts connected by a clutch section 171. Sleeve 170 is held in bearings 172, 173 in the interior of the cylindrical needle bed 28, and to its lower end is secured an arm 174, provided with a roller 175. A similar arm 176 with a roller 177 is secured to the lower end of the shaft 169. 178 designates a short horizontal shaft having bearings in the standard 25 and in a bracket 179 extending inwardly therefrom. A cam wheel 180 is secured to this shaft near its inner end and alongside this wheel is another cam wheel 181. In the cam grooves of these wheels the rollers 175 and 177 of the arms 174, 176 fit respectively. These cam grooves are shown at Fig. 6 with three steps reversely arranged so that as the cam wheels are intermittently moved the arms 174 and 176 will be rocked in opposite direction—and the segmental gears, connected by the sleeve 170 and shaft 169 to them, will cause the two parts 162 and 163 of the needle bed to move in opposite directions. The cam wheels have spaced taper holes 182 in which a locking pin 183 is placed to fasten the cam wheel 181 to 180. Portions of the cam groove in wheel 181 may be made with a less or greater number of steps than shown at Fig. 6, and the wheel may be set to bring such portions under roller 177—thus causing the two parts 162, 163 of the needle bed to be differently racked, or a plain straight part of the cam may be set under the roller. The part 162 of the bed will then be stationary while the part 163 is racked. Pattern chain 50 is the racking chain and when placed on the sprocket wheel 75 it acts on the roller 184 of a lever 185 rocking on the stud 71. This chain has links of three forms, the main portion being of medium height which holds the lever 185 in central position, low links 186 and high links 187 arranged so as to rock the lever where and when racking of the needles is desired in knitting a piece of goods. A link 188 connects the end of lever 185 to one end of a short lever 189 whose shaft 190 has a bearing in and extends through the standard 25, and to the inner end of this shaft is secured an arm 191, which by its slotted end and a pin 192 on the bar 193, horizontally arranged, causes said bar to be reciprocated when the lever 189 is rocked. A link 194 connects the other end of the short lever 189 to an arm or lever 195, held to rock on the stud 71, and by a roller 196 is actuated when the chain 50, removed from the sprocket 75, is placed on the sprocket 197. This sprocket is secured to the sleeve 212, on stud 69, as is also the ratchet wheel 76 which is actuated by the pawl 81 carried by the sliding bar 78. See Figs. 22 and 23. With chain 50 in this position the racking bar 193 is, by the mechanism just described, caused to move in the same manner as when the chain is on the sprocket 75 actuating the lever 185, and may be so used when it is desired to produce a continuous strip of material, either ribbed or plain, with fancy patterns at intervals throughout its length, the pattern designs being determined by the arrangement and location of the low and high links 186 and 187 in the chain 50.

The connecting mechanism between the racking bar 193 and cam shaft 178 comprises a ratchet wheel 198 having reverse ratchet teeth on its opposite sides horizontally arranged, pawls 199 and 200 carried by a cross head 201 on a vertically moving bar 202, a roller on this bar 202 which works in the groove of a face cam 203 carried on a shaft 204 having bearings in brackets depending from the bed plate 24 of the machine, a sprocket wheel 205 on this shaft, by a chain 206, receiving motion from the shaft 84, a link 207 being pivotally connected to the pawl 200 and attached to pawl 199 by a slotted connection. The end of the bar acts on a pin 208 projecting from the pawl 200. A spring 209 acts to hold pin 208 against the end of bar 193. A spring 210 is located between the pawls 199 and 200 to cause them to act alternately on the ratchet wheel 198. In normal inoperative position the arm 191 is vertical, both the pawls 199 and 200 then being held out of contact with the ratchet wheel and consequently do not affect the same although the pawls are continuously moved at regular intervals by the operating parts of the cam 203, as said cam is continuously rotated. This condition exists when the links of the chain 50 of medium height are passing under the roller 184 of the lever 185, of Fig. 23, or under the roller 196 of the lever 195 of Fig. 22. When a low link 186 passes under the rollers the arm 191 moves toward the left in Fig. 5 and toward the right in Figs. 22 and 23, allowing the pawl 200 to act on the ratchet 198, and through the medium of cams 180 and 181 cause the needles to be racked one step for each link of the chain, or two steps when two adjoining links are low links, as shown in Figs. 22 and 23. The other pawl 199 is brought into action and racks the needles back to normal position when the high links 187 of the chain pass under the rollers of the levers 185 or 195. Of course it will be understood that the number of rackings of the needles and their order will be determined by the number of the high and low links in the chain in each group, and the arrangement of such groups of links in the chain. It will also be understood that the acuating links of the other chains described will be in such number and arrangement on each chain as to produce the desired styles of stitches and fashioning effects in the different parts of the material or article being made.

The pawl carrying bar 78, it will be observed, makes a complete reciprocation for each revolution of the main controlling parts of the machine. The pawl 80 would therefore, if uncontrolled, move the chains one link during each forward movement of the bar, and this would require the use of very long chains to produce complete fashioned articles of considerable length. To obviate this and enable comparatively short chains to be used, the pawl 80 is permitted to act on the ratchet wheel 72 once only for a given number of reciprocations of the bar 78, determined by particular requirements of the operation of the machine. For this purpose a governing chain 51, which may be quite short, is carried by a sprocket wheel 211 on a sleeve 212 to which is connected the ratchet wheel 76, as is also the sprocket wheel 197; said sleeve being on the stud 69. This chain 51 is of uniform depth except at intervals of a given number, according to its length and required governing power; it has low teeth 213 onto which the roller 214 at one end of a lever 215 falls. Lever 215 rocks on stud 71 and its other end acts on a projection of a lever 216 pivoted at 217 to a bearing of the bar 78. This lever 216 is formed to extend beneath a pin 218 on the pawl 80. Now when the roller 214 rests on the high main portion of the chain 51, the pawl 80 is raised and held away from the ratchet wheel 72, and when a low part of chain 50 comes under the roller 213 the pawl 80 is released and acts on the ratchet wheel 72 to feed the pattern chains under their respective levers. The length of the low part of chain 51 or number of links therein is regulated by the number of high and low links in the pattern chains.

When the chain 50 is used on the sprocket wheel 197, Fig. 22, it may be actuated at intervals in manner similar to its control when on sprocket wheel 75; in this case the pawl 81 is raised and held away from the ratchet wheel 76 by a short lever 219 pivoted at 220 and acting by one of its ends under a pin 221 projecting from the side of the pawl, the other end of lever 219 being depressed by the end 222 of the lever 110 when the roller 109 of said lever is moved from a low link to a high link of a governing chain carried by the sprocket wheel 74.

The separating thread is laid by the eyelet 223 in adjoining courses of the knitting at the junction of adjoining articles. This eyelet is carried by an arm 224 attached to a block 225 fitted to slide on a circular guideway 226 on the inner side of the ring 32. A lug 227 projects from the outer side of the block 225 arranged in opposition to a plug 228 fitted to slide in a head 229 on a standard 230, carried by the cam carrier 88 of the cylindrical needle bed of the machine, see Fig. 3. Stem 231 of the plug 228 extends through the head 229 and has secured to its outer end the part 232 of a clutch shaped cam, the counterpart of which is on a ratchet wheel 233 fitted to rotate on the stem 231. This ratchet is actuated by a pawl 234 carried by a slide 235 on the head 229. A lever 236 pivoted at 237 acts by its inner end on the slide 235 and has a roller 238 at its outer end. A spring 239 in the head 229 forces the plug 228 out when the ratchet 233 is moved to let the teeth of the cam clutch 232 enter the spaces between the cam teeth of the ratchet. These parts are similar to and operate in the same manner as the devices illustrated in Figs. 17 and 18 for controlling the needle cam 90. The horizontally moving bar 57 controlled by the vertical bar 44 acts, when set inwardly, on the roller 238 to move the ratchet wheel 233. The bar 44 also controls the bars 55 and 59, which operates respectively the cam 138 of the upper set of needles and the cam 90 of the cylindrically arranged set of needles when the separating threads are to be inserted in the fabric. As the plug 228 is thrown out it contacts with the lug 227 causing the thread carrier 225 to travel with the needle operating cam 90 in laying the thread in a course of stitches in one direction. The thread carrier is then caused to travel with the cam 138 in laying the thread in the adjoining course of stitches in the other direction by means of a spring actuated plug latch 251 carried by an arm 240 on the cam carrier 137. These devices are illustrated in Fig. 24. There are two separating thread carriers, 225 and 252, one for each half of the machine. Normally, while the body portions of the fabrics are being knitted, these separating thread carriers rest in diametrical positions, as indicated, adjacent the ledge carrying blocks 242 and 253 oppositely located on the outer and inner sides of the ring 137 respectively. The blocks 242 are provided with cam ledges 241 and the blocks 253 with cam ledges 254. Assuming the latches 228 and 251 to be in active condition, in the position shown which for descriptive purposes we will call the starting side of the machine, and traveling in opposite directions, as indicated by the arrows, the latch 228 will pick up the thread carrier 225 by its lug 227 and, during the first half revolution of the machine, carry 225 to the opposite side of the machine. The latch 228 is then released from the lug 227 by riding up the incline of ledge 241. The latch 251 which is now at this side of the machine engages the lug 255 on the inner side of the thread carrier 225, and moves said carrier back to its original position at the starting side of the machine during the second half of the revolution of the machine. At the same time the latch 228 carries the other separating thread carrier 252, by engagement with its lug 227, to the starting side of the machine and leaves it there, as indicated by the dotted lines 252ª and 227ª, by riding on the ledge 241 away from the lug 227ª. The latch 228 is now withdrawn from active position, as before described, and during the first half of the second revolution the carrier 252 is engaged by the latch 251, which is still active, and is moved to the opposite side of the machine and there released in position shown. Now, it will thus be seen that the thread carriers 225 and 252 have completed a forward and backward movement at their respective halves of the machine, and that two courses of separating threads have been laid at each section of the machine to enable two adjacent articles or parts of knitting formed in each section to be readily separated.

The latches 228 and 251 rotate continuously during knitting operation, the outside one 228 being held in outer inactive position until released to pick up a thread carrier 225. The inside latch 251 may be in position to act all the time, but it is apparent it will not pick up the carriers when they are in normal positions of rest, as indicated, as then the pick up lugs 255 of the carriers are protected by the cam ledges 254. Latch 251 can only actuate a carrier 225, after the carrier has been moved by latch 228 into opposite position, to bring said carrier back to normal position of rest.

It will be understood that the parts described and shown will be duplicated, where necessary, to act on the two groups of needles in both of the vertical and horizontal set of needles.

In Figs. 1 and 2 are shown a set of discharging rollers 243 and pressure weights 244 of ordinary construction. These rollers are in this case driven by the cam shaft 204, on which is a pinion meshing into a gear wheel 245 on the shaft of one of the rollers.

At Fig. 23ª is conventionally shown an article, as a sleeve, this machine is adapted to produce. Of course any knitted article or fabric may be produced by this machine although it is designed to produce principally sweaters, and the sleeve illustrated may be taken as a sweater sleeve. In this view 246 represents the cuff which may be a rib stitch, 247 one or more rows of stitches that may be produced by the racking mechanism, 248 the body of the sleeve that may be a Cardigan or other desired form of stitch, and in any part of which may be a band of fancy stitches 249. 250 indicates the separating thread arranged between adjacent articles which are successively continuously formed by the machine.

I claim:

1. A knitting machine of the character described, comprising means for automatically producing different kinds and styles of stitches in articles continuously connectedly produced by the machine, and means for automatically inserting a separating thread between the articles and connecting them together consisting of a cam adjacent the regular knitting cam and automatically set to act on the needles when the separating thread is being laid, a thread carrier, means for moving it in one direction, a cam ledge for disconnecting it from said moving means, and means for moving the thread carrier back in the opposite direction.

2. A knitting machine of the character described, comprising means for automatically producing different kinds and styles of stitches in articles continuously connectedly produced by the machine, means for automatically inserting a separating thread between the articles consisting of a thread carrier, means for moving it in one direction, a cam ledge for disconnecting it from said moving means, and means for moving the thread carrier back in the opposite direction, needle operating cams, and means for moving and holding said cams into position when the carrier is laying the separating thread and out of action when it is stationary.

3. A knitting machine, comprising a needle operating cam, a latch pivoted therein adapted to form a continuation of its upper edge and to project therefrom, constituting another needle riser, a needle depressing cam adapted to be raised and lowered, and means for automatically setting and holding the latch within or projecting from the upper surface of the cam, and means for automatically setting and holding the depressing cam in lower and upper positions, whereby when the cam is set in lower position more yarn is fed to the loops to form tuck stitches than when the cam is set in upper position to form regular stitches.

4. A knitting machine, comprising a needle operating cam, a latch pivoted therein adapted to form a continuation of its upper edge and to project therefrom, constituting another needle riser, a needle depressing cam adapted to be raised and lowered, a rotating cam carrier, a shaft provided with a ratchet wheel, an arm rocking on the shaft provided with a pawl adapted to act on the ratchet wheel, means for imparting motion from the shaft to the depressing cam and to the latch, a roller on the end of the arm, a sliding bar adapted to be set in the path of travel of the roller, and means for actuating the sliding bar.

5. A knitting machine, comprising a needle operating cam, a latch pivoted therein adapted to form a continuation of its upper edge and to project therefrom, constituting another needle riser, a needle depressing cam adapted to be raised and lowered, a rotating cam carrier on which the cams are held, means for actuating the cams comprising a rocking arm, a horizontal sliding bar, a vertical sliding bar, provisions between the two bars to impart motion to the horizontal when the vertical is moved, a pattern chain, means for moving it and means between the vertical bar and chain for moving the vertical bar by the pattern links of the chain.

6. A knitting machine of the character described, comprising a cylindrical needle bed, a cam carrier fitted to rotate around the bed, cams on the carrier adapted to operate the needles, means for automatically setting the cams to raise the needles to ordinary knitting height or to a greater height, said needles being depressed a less distance after being raised to the greater height than when raised to ordinary knitting height, a pattern chain, means for moving it, a sliding bar controlled by the pattern chain and thereby set with its end in the path of travel of a rocking arm of the cam setting means, whereby when said arm passes over and is moved by the bar the cams are set to raise the needles to the greater height and when the arm passes by and is a second time moved by the bar the cams are set to raise the needles to ordinary knitting height.

7. A knitting machine of the character described, comprising a cylindrical needle bed, a cam carrier fitted to rotate around the bed, cams on the carrier adapted to operate the needles, including a cam adjacent the regular knitting cam and adapted to be automatically set to act on the needles when the separating thread is being laid, means for rotating the cam carrier, a separating thread carrier, a circular guide-way concentric with the cam carrier and on which the thread carrier is fitted to move, a bracket extending from the cam carrier, a lug extending from the thread carrier, a sliding plug carried by the bracket, means for moving the plug to contact with the lug of the thread, and an adjustable cam ledge on the circular guide-way adapted to push the plug away from the lug.

8. A knitting machine of the character described, comprising a cylindrical needle bed, a cam carrier fitted to rotate around the bed, cams on the carrier adapted to operate the needles including a cam adjacent the regular knitting cam and adapted to be automatically set to act on the needles when the separating thread is being laid, means for rotating the cam carrier, a separating thread carrier, a circular guide-way concentric with the cam carrier and on which the thread carrier is fitted to move, a bracket extending from the cam carrier, a lug extending from the thread carrier, a sliding plug carried by the bracket, a horizontally moving bar, operating connection between the horizontal bar and the plug, a vertical bar having sliding connection with the horizontal bar, a pattern chain, means for moving it, and operating means between the chain and the vertical bar.

9. A knitting machine of the character described, comprising a cylindrical needle bed, a cam carrier fitted to rotate around ed, cams on the carrier adapted to operate the needles, a disk needle bed horizontally arranged, a cam carrier therefor, cams carried thereby, means for rotating this cam carrier coincidently with but in opposite direction to the cylindrical needle bed cam carrier, a horizontally sliding bar for each of the cam carriers, means for operatively connecting the bars respectively to the cams of carriers, a vertical bar with sliding connections to the two horizontal bars, and means for automatically actuating the vertical bar.

10. A knitting machine of the character described, comprising a cylindrical needle bed, a cam carrier fitted to rotate around the bed, cams on the carrier adapted to operate the needles, a disk needle bed horizontally arranged, a cam carrier therefor, cams carried thereby, means for rotating this cam carrier coincidently with but in opposite direction to the cylindrical needle bed cam carrier, a circular flat bar slidably connected to and extending about half way around the cam carrier of the disk needle bed, means connecting the cams to one end of the circular bar, a horizontal sliding bar, means connected to the other end of the circular bar adapted when passing the horizontal bar to be actuated thereby to move the circular bar, and means for automatically moving the horizontal bar.

11. A knitting machine of the character described, comprising a cylindrical needle bed, a cam carrier fitted to rotate around the bed, cams on the carrier adapted to operate the needles, a disk needle bed horizontally arranged, a cam carrier therefor, cams carried thereby, means for rotating this cam carrier coincidently with but in opposite direction to the cylindrical needle bed cam carrier, a circular flat bar slidably connected to and extending about half way around the cam carrier of the disk needle bed, means connecting the cams to one end of the circular bar, a horizontal sliding bar, means connected to the other end of the circular bar adapted when passing the horizontal bar to be actuated thereby to move the circular bar, a vertical bar slidably connected to the horizontal bar, a pattern chain, means for intermittently moving it, and means acted upon by the pattern links of the chain to move the sliding bar.

12. A knitting machine of the character described, comprising a cylindrical needle bed, a cam carrier fitted to rotate around the bed, cams on the carrier adapted to operate the needles, a disk needle bed horizontally arranged, a cam carrier therefor, cams carried thereby, means for rotating this cam carrier coincidently with but in opposite direction to the cylindrical needle bed cam carrier, a circular flat bar slidably connected to and extending about half way around the cam carrier of the disk needle bed, a cam adapted to be moved into the path of the needles and to be held away therefrom, means connecting this to one end of the circular bar, a lever connected to the other end of the circular bar, a roller on the end of the lever, a horizontal bar, and automatically operated means for moving the end of the horizontal bar into and out of the path of travel of the roller as the cam carrier rotates.

13. A knitting machine of the character described, comprising a cylindrical needle bed, a cam carrier fitted to rotate around the bed, cams on the carrier adapted to operate the needles, a disk needle bed horizontally arranged, divided into two sections fitted to circularly move coincident with cylinder needle bed, the needles of the disk or horizontal needle bed at all times maintaining radial positions, and means automatically operated for simultaneously moving the two sections of said bed to rock their respective needles in opposite directions.

14. A knitting machine of the character described, comprising a cylindrical needle bed, a cam carrier fitted to rotate around the bed, cams on the carrier adapted to operate the needles, a disk needle bed horizontally arranged, divided into two sections fitted to circularly move coincident with cylinder needle bed, means automatically operated for moving one or both of the two sections of said bed to and fro comprising a section of internal gear teeth attached to each of the bed sections, segmental gears meshing therewith and means adjustably connected for rocking one or both of the segmental gears.

In testimony whereof, I have hereunto subscribed my name.

HERMANN A. KLEMM.

Witnesses:
L. F. BROWNING,
LAURA E. SMITH.